US010549666B2

(12) United States Patent
Takahashi et al.

(10) Patent No.: US 10,549,666 B2
(45) Date of Patent: Feb. 4, 2020

(54) FLEXIBLE POLYURETHANE FOAM MOLDED ARTICLE, AND SEAT PAD

(71) Applicant: BRIDGESTONE CORPORATION, Tokyo (JP)

(72) Inventors: Yoshiyuki Takahashi, Tokyo (JP); Taisuke Yonezawa, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/770,057

(22) PCT Filed: Nov. 10, 2016

(86) PCT No.: PCT/JP2016/083360
§ 371 (c)(1),
(2) Date: Apr. 20, 2018

(87) PCT Pub. No.: WO2017/082341
PCT Pub. Date: May 18, 2017

(65) Prior Publication Data
US 2018/0312089 A1 Nov. 1, 2018

(30) Foreign Application Priority Data
Nov. 11, 2015 (JP) ................. 2015-221442

(51) Int. Cl.
*B60N 2/70* (2006.01)
*B32B 5/32* (2006.01)
(Continued)

(52) U.S. Cl.
CPC .......... *B60N 2/7017* (2013.01); *A47C 27/148* (2013.01); *B32B 5/145* (2013.01);
(Continued)

(58) Field of Classification Search
CPC ... B32B 5/32; B32B 2605/003; B60N 2/7035; B60N 2/70
See application file for complete search history.

(56) References Cited

U.S. PATENT DOCUMENTS

2003/0087084 A1   5/2003   Mori et al.
2003/0186044 A1   10/2003  Sauniere et al.
(Continued)

FOREIGN PATENT DOCUMENTS

FR   2897023 A1   8/2007
JP   11-35725 A   2/1999
(Continued)

OTHER PUBLICATIONS

Communication dated Jul. 4, 2018 from the European Patent Office in counterpart application No. 16864302.1.
(Continued)

*Primary Examiner* — Hai Vo
(74) *Attorney, Agent, or Firm* — Sughrue Mion, PLLC

(57) ABSTRACT

A flexible polyurethane foam molded article includes a plurality of layer parts (L1 to L10) that are layered in a vertical direction (Y) perpendicular to a stage surface (1A). When the entire flexible polyurethane foam molded article is compressed by 15% in the vertical direction (Y), the front surface layer (L1) positioned closest to the stage surface (1A) in the vertical direction (Y) among the plurality of layer parts (L1 to L10) has the lowest residual thickness ratio in the vertical direction (Y) among the plurality of layer parts (L1 to L10). When the entire flexible polyurethane foam molded article is compressed by 50% in the vertical direction (Y), the back surface layer (L10) positioned closest to a non-stage surface (1B) of the flexible polyurethane foam molded article in the vertical direction (Y) among the plurality of layer parts (L1 to L10) has the highest residual
(Continued)

thickness ratio in the vertical direction (Y) among the plurality of layer parts (L1 to L10).

8 Claims, 9 Drawing Sheets

(51) Int. Cl.
*A47C 27/14* (2006.01)
*B32B 5/14* (2006.01)

(52) U.S. Cl.
CPC .................. *B32B 5/32* (2013.01); *B60N 2/70* (2013.01); *B32B 2266/0278* (2013.01); *B32B 2605/003* (2013.01)

(56) References Cited

U.S. PATENT DOCUMENTS

2012/0313421 A1 12/2012 Kondo
2017/0101040 A1 4/2017 Shinohara et al.

FOREIGN PATENT DOCUMENTS

| | | |
|---|---|---|
| JP | 2003-211612 A | 7/2003 |
| JP | 2003-284875 A | 10/2003 |
| JP | 2011-189121 A | 9/2011 |
| JP | 4843476 B2 | 12/2011 |

OTHER PUBLICATIONS

International Search Report of PCT/JP2016/083360 dated Jan. 10, 2017.

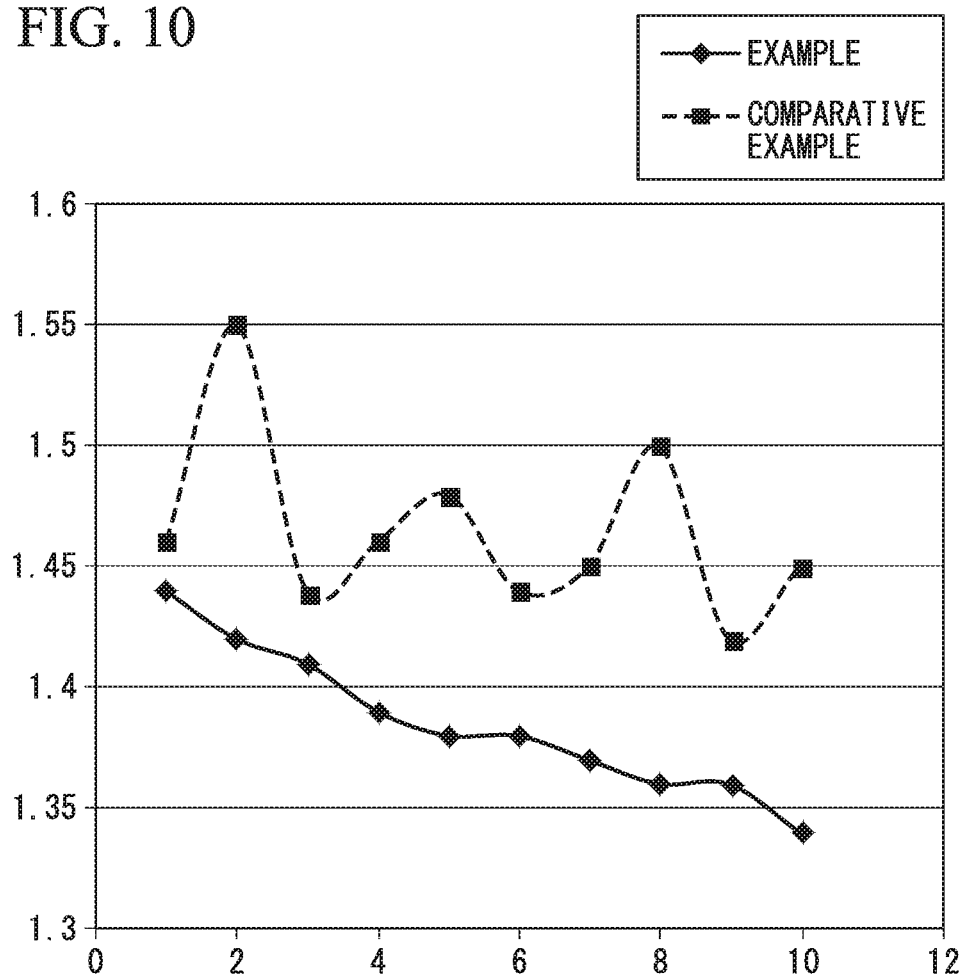

FLEXIBLE POLYURETHANE FOAM MOLDED ARTICLE, AND SEAT PAD

CROSS REFERENCE TO RELATED APPLICATIONS

This application is a National Stage of International Application No. PCT/JP2016/083360 filed Nov. 10, 2016, claiming priority based on Japanese Patent Application No. 2015-221442 filed Nov. 11, 2015.

TECHNICAL FIELD

The present invention relates a flexible polyurethane foam molded article, and a seat pad.

Priority is claimed on Japanese Patent Application No. 2015-221442, filed Nov. 11, 2015, the content of which is incorporated herein by reference.

BACKGROUND ART

In the related art, for example, a configuration shown in Patent Document 1, is known as a flexible polyurethane foam molded article, for example, a seat pad or the like having a stage surface. In this molded article, a core layer (intermediate layer) is actively bent further than a top surface layer, the core layer absorbs vibrations and the top surface layer supports the buttocks, and a feeling of fitness (feeling of seating) when sitting is improved.

CITATION LIST

Patent Document

[Patent Document 1]
 Japanese Unexamined Patent Application, First Publication No. 2011-189121

SUMMARY OF INVENTION

Technical Problem

However, in the flexible polyurethane foam molded article of the related art, if a centrifugal force (centrifugal acceleration G) is applied to a vehicle body when a vehicle travels along a curve or changes lanes, a top surface layer is deviated in a lateral direction with respect to a core layer, for example, the lumbar region of an occupant, a mounting object, or the like may tilt in a lateral direction and be shaken.

The present invention has been made in view of the above-described circumstances, and an object of the present invention is to reduce a feeling of shakiness while preventing a feeling of seating from being impaired.

Solution to Problem

A flexible polyurethane foam molded article according to an embodiment of the present invention is a flexible polyurethane foam molded article that has a stage surface and is obtained by foam molding a foaming stock solution. The flexible polyurethane foam molded article includes a plurality of layer parts that are layered in a vertical direction perpendicular to the stage surface. When the entire flexible polyurethane foam molded article is compressed by 15% in the vertical direction, a front surface layer positioned closest to the stage surface in the vertical direction among the plurality of layer parts has the lowest residual thickness ratio in the vertical direction among the plurality of layer parts. When the entire flexible polyurethane foam molded article is compressed by 50% in the vertical direction, a back surface layer positioned closest to a non-stage surface of the flexible polyurethane foam molded article in the vertical direction among the plurality of layer parts has the highest residual thickness ratio in the vertical direction among the plurality of layer parts.

Advantageous Effects of Invention

According to the present invention, it is possible to reduce a feeling of shakiness while preventing a feeling of seating from being impaired.

BRIEF DESCRIPTION OF DRAWINGS

FIG. 10 is a graph in which aspect ratios of layer parts in the example of the present invention and the comparative example are compared.

A flexible polyurethane foam molded article and a seat pad according to embodiments of the present invention will be described below with reference to the drawings.

DESCRIPTION OF EMBODIMENTS

Figure 1:
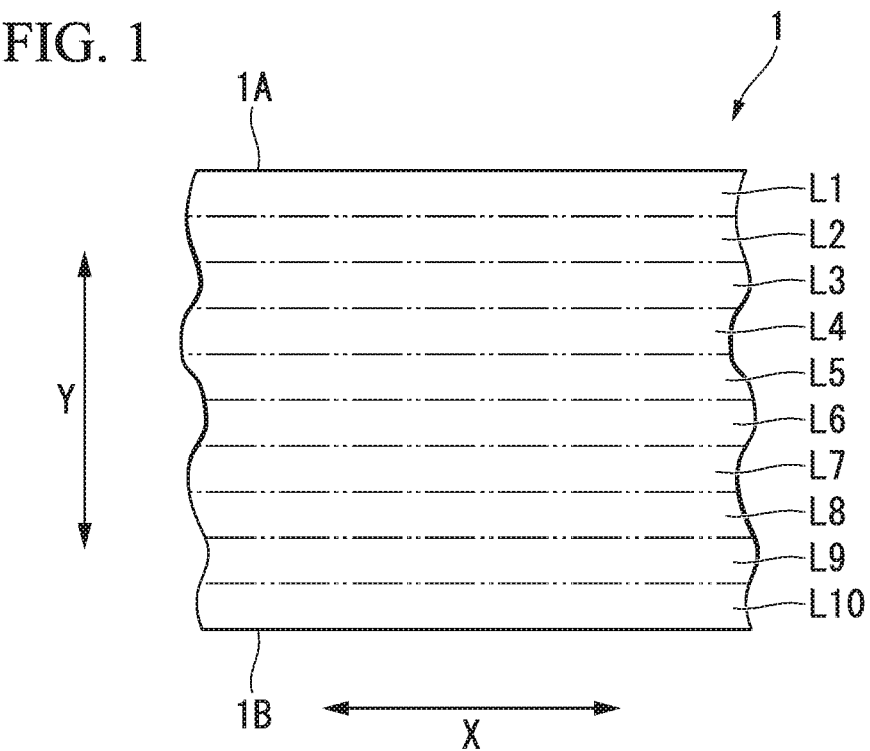
FIG. 1 is a side view showing a part of a seat pad according to an embodiment of the present invention.

As shown in FIG. 1, a seat pad 1 of the present embodiment is a flexible polyurethane foam molded article that is used for a seat (seating part) attached to, for example, an automobile (vehicle), has a seating surface 1A (stage surface) and a back surface 1B that is positioned on the side opposite to the seating surface 1A in a vertical direction Y perpendicular to the seating surface 1A, and is obtained by foam molding a foaming stock solution. As will be described below, the foaming stock solution contains, for example, a polyol component, a polyisocyanate component, a crosslinking agent, a foaming agent, and a catalyst.

The length (thickness) of the seat pad 1 in the vertical direction Y is, for example, 30 mm to 150 mm, and preferably 30 mm to 150 mm. The seat pad 1 includes a plurality of layer parts L1 to L10 that are layered in the vertical direction Y. In the present embodiment, one type of foaming stock solution is foamed and the entire seat pad 1 is integrally molded to form the seat pad 1. The plurality of layer parts L1 to L10 are formed by substantially equally dividing (substantially uniformly dividing) the seat pad 1 in a no-load state into 3 layers or more and 20 layers or less (10 layers in the shown example) in the vertical direction Y. Here, as indicated by two-dot chain lines in FIG. 1, a surface (parallel to) along the seating surface 1A or the back surface 1B can be used as a partition surface that partitions the layer parts L1 to L10.

Figure 2:
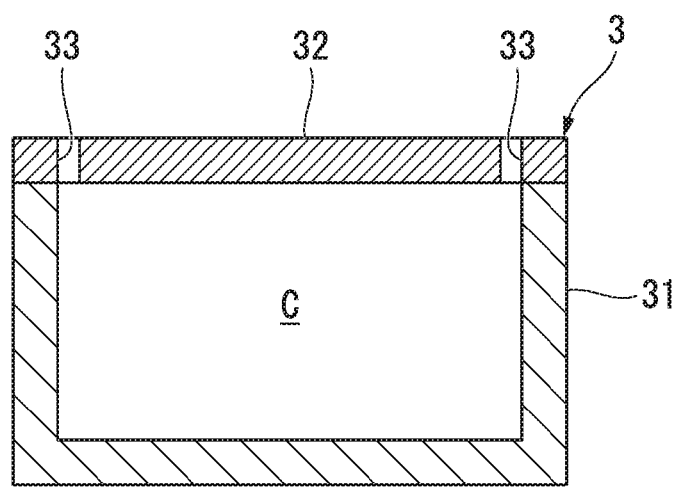
FIG. 2 is a vertical cross-sectional view of a mold for producing the seat pad shown in FIG. 1.

The seat pad 1 is molded using, for example, a mold 3 shown in FIG. 2.

The mold 3 is formed in a box shape including a lower mold 31 and an upper mold 32 and an internal space thereof serves as the cavity C that forms the seat pad 1. The upper mold 32 is a lid that closes an upper opening of the lower mold 31 and an air vent hole 33 is formed to vertically penetrate an outer circumferential part thereof.

Here, for example, the layer parts L1 to L10 are each formed of one different type of material and molded by foaming a foaming stock solution separately, and the seat pad 1 may be formed by laminating the layer parts L1 to L10. In this case, instead of separately molding the layer parts L1 to L10 with one different type of material, the layer parts L1 to L10 may be formed by laminating a plurality of thin layer bodies obtained by foam molding a foaming stock solution. That is, the plurality of layer parts include a plurality of layer parts in which a single seat pad 1 (flexible polyurethane foam molded article) is divided into layers in the vertical direction Y as in the present embodiment and also include layer parts in which a plurality of single layer parts are laminated and formed in the vertical direction to form one seat pad unlike the present embodiment.

The front surface layer L1 positioned closest to the seating surface 1A in the vertical direction Y among the plurality of layer parts L1 to L10 has the lowest residual thickness ratio in the vertical direction Y among the plurality of layer parts L1 to L10 when the entire seat pad 1 is compressed by 15% in the vertical direction Y. In addition, when the entire seat pad 1 is compressed by 50% in the vertical direction Y, the back surface layer L10 positioned closest to the back surface 1B (a non-stage surface or a non-seating surface) in the vertical direction Y among the plurality of layer parts L1 to L10 has the highest residual thickness ratio in the vertical direction Y among the plurality of layer parts L1 to L10.

Here, the residual thickness ratio of the layer parts L1 to L10 in a state in which a predetermined load is applied (hereinafter referred to as a "load-applied state") refers to a ratio $(T/T_0)$ of a thickness (T) in a load-applied state with respect to a thickness $(T_0)$ when the layer parts L1 to L10 are in a no-load state.

Here, when the entire seat pad 1 is compressed by 15% in the vertical direction Y, a difference between the residual thickness ratio of the front surface layer L1 and the residual thickness ratio of the back surface layer L10 is 20% or more and 36% or less. In addition, when the entire seat pad 1 is compressed by 20% in the vertical direction Y, values of the residual thickness ratios of the layer parts L1 to L10 gradually increase from the front surface layer L1 to the back surface layer L10. In addition, when the entire seat pad 1 is compressed by 50% in the vertical direction Y, the difference between the residual thickness ratio of the front surface layer L1 and the residual thickness ratio of the back surface layer L10 is 31% or more and 47% or less, and the residual thickness ratio of the back surface layer L10 is 80% or more.

In addition, when the entire seat pad 1 is largely compressed in the vertical direction Y, the residual thickness ratio of the front surface layer L1 decreases while the rate of change decreases. The front surface layer L1 is likely to be compressed in a stage in which an applied load is small and is unlikely to be compressed in a stage in which an applied load is large.

Further, when the entire seat pad 1 is largely compressed in the vertical direction Y, the residual thickness ratio in at least one layer positioned on the side of the back surface 1B relative to the center of the seat pad 1 in the vertical direction Y among the plurality of layer parts L1 to L10 decreases while a rate of change increases. In the present embodiment, the center of the seat pad 1 in the vertical direction Y is positioned on a boundary between the fifth layer part L5 and the sixth layer part L6 from the seating surface 1A. Then, among the plurality of layer parts L6 to L10 positioned on the side of the back surface 1B relative to the center of the seat pad 1 in the vertical direction Y, in the layer part L9 adjacent to the back surface layer L10, that is, the layer part L9 (hereinafter referred to as a "back surface adjacent layer L9") that is the second layer part from the side of the back surface 1B, the residual thickness ratio decreases while a rate of change increases as described above. The back surface adjacent layer L9 is unlikely to be compressed in a stage in which an applied load is small and is likely to be compressed in a stage in which an applied load is large.

Incidentally, in the present embodiment, when the entire seat pad 1 is compressed, the seating surface 1A and the back surface 1B are compressed over the entire surface, and are compressed overall to the same extent in the vertical direction Y (entire surface compression) regardless of a position in a lateral direction X along the seating surface 1A in the seat pad 1. Therefore, it is possible to effectively remove an influence of tension that can be applied in the lateral direction X when the seat pad 1 is compressed.

Here, a flexible polyurethane foam that is a material of the seat pad 1 will be described.

An exemplary embodiment of a flexible polyurethane foam is a flexible polyurethane foam that is obtained by foam molding a foaming stock solution containing a polyol, a polyisocyanate, a cross-linking agent, a foaming agent, and a catalyst. Materials constituting the foaming stock solution have the following features (A) to (C).

(A) A polyether polyol whose weight-average molecular weight (Mw) is 3,000 to 12,000 and whose number of functional groups (number of hydroxyl groups) is 3 to 4 is contained as a polyol component.

(B) The molar ratio of ethylene oxide groups/propylene oxide groups in the entire compound (all the cross-linking agent) contained in a foaming stock solution as a cross-linking agent component is 100 or more.

(C) Diphenylmethane diisocyanate (MDI) is contained with an isocyanate equivalent of 70 or more as a polyisocyanate.

<Polyol Component>

As a polyol component constituting the foaming stock solution, a polyether polyol whose weight-average molecular weight Mw is 3,000 to 12000 and whose number of functional groups (number of hydroxyl groups) is 3 to 4 is contained. As the polyether polyol, a polyether polyol obtained by ring-opening polymerization of an alkylene oxide is preferable since it has favorable reactivity.

Examples of the alkylene oxide include propylene oxide (PO), and ethylene oxide (EO) and the like. One type or two or more types of alkylene oxide may be used as a material of the polyether polyol.

As the polyether polyol constituting the foaming stock solution, a polyether polyol obtained with a combination of PO and EO is appropriate in consideration of raw material activity. The blending ratio (a molar ratio) between PO and EO is not particularly limited. For example, as the EO/PO (the molar ratio), 8/92 to 25/75 is preferable, and 13/87 to 20/80 is more preferable. When the EO/PO (the molar ratio) is within this range, it is possible to easily generate a polyether polyol having favorable reactivity.

The number of hydroxyl groups (functional groups) included in one molecule of a polyether polyol constituting the foaming stock solution is preferably 3 to 4. Within such an appropriate range, a flexible polyurethane foam having a moderate viscosity in the foaming stock solution and excellent physical properties is obtained. As an optional component, in addition to the polyether polyol of (A), a polyether polyol having two functional groups may be used in combination therewith.

The weight-average molecular weight (Mw) of the polyether polyol constituting the foaming stock solution is preferably 3,000 to 12,000, more preferably 3,000 to 8,000, and most preferably 5,000 to 8,000. When the weight-average molecular weight of the polyether polyol is 12,000 or less, the viscosity of the foaming stock solution is not excessively high and stirring efficiency is improved. On the other hand, when the weight-average molecular weight of the polyether polyol is 3,000 or more, a flexible polyurethane foam having a favorable rebound resilience is obtained. Here, the weight-average molecular weight (Mw) is a value that is calculated as a polystyrene conversion value by gel permeation chromatography (a GPC method). Here, as an optional component, in addition to the polyether polyol of (A), a polyether polyol whose weight-average molecular weight is larger than 8,000 and 12,000 or less may be used in combination therewith.

A degree of unsaturation of the polyether polyol constituting the foaming stock solution is preferably 0.03 mequiv/g or less. When the degree of unsaturation is 0.03 mequiv/g or less, a flexible polyurethane foam having favorable physical properties such as durability or the like is obtained. Here, the "degree of unsaturation" refers to the total degree of unsaturation (mequiv/g) that is measured using a method of titrating an acetate that is liberated when mercuric acetate acts on unsaturated bonds in a specimen with potassium hydroxide in compliance with JIS K 1557-1970.

One type or two or more types of polyether polyol may be contained in the foaming stock solution as the polyol component.

When one type of polyether polyol is contained in the foaming stock solution as the polyol component, a polyether polyol whose weight-average molecular weight is 7,000 or more and whose number of functional groups is 4 (4-functional) is preferably contained. When the polyether polyol is contained, it is possible to significantly decrease the above-described feeling of shakiness when a flexible polyurethane foam obtained by foam molding is used as a seat pad.

In order for desired physical properties to be easily provided to the flexible polyurethane foam obtained by foam molding the foaming stock solution, as a total content of the one, or two or more types of polyether polyol corresponding to the polyether polyol of (A) with respect to a total mass of the polyol components contained in the foaming stock solution, 60 mass % or more is preferable, 70 to 100 mass % is more preferable, 80 to 100 mass % is still more preferable, and 85 to 100 mass % is most preferable.

As the polyol component constituting the foaming stock solution, in addition to the polyether polyol, a polymer polyol may be used in combination therewith. As the polymer polyol, a polymer polyol that is generally used for a polyurethane foam molded article can be applied. For example, a polymer polyol obtained by graft copolymerization of a polymer component such as polyacrylonitrile, and an acrylonitrile-styrene copolymer or the like with a polyether polyol that includes a polyalkylene oxide and has a weight average molecular weight Mw of 3,000 to 8,000, and more preferably, 4,000 to 7,000 is exemplified. As an alkylene oxide serving as a raw material of the polyalkylene oxide, an alkylene oxide containing propylene oxide (PO) as a functional group (a polymerizable group) is preferable. Alkylene oxides containing only propylene oxide or alkylene oxides containing both propylene oxide and ethylene oxide (EO) are more preferable. In addition, a content of the polymer component with respect to a total mass of the polymer polyols is preferably 25 to 50 mass %.

As a mixing ratio when a polyether polyol and a polymer polyol are mixed in as the polyol component constituting the foaming stock solution, 70/30 to 99/1 is preferable, 80/20 to 99/1 is more preferable, and 85/15 to 99/1 is most preferable as a mass ratio of polyether polyol/polymer polyol. Within the above range, it is easy to obtain a flexible polyurethane foam having desired physical properties.

<Polyisocyanate Component>

As a polyisocyanate component constituting the foaming stock solution, diphenylmethane diisocyanate is contained with an isocyanate equivalent of 70 or more.

The diphenylmethane diisocyanate (MDI) is a polyisocyanate component that is generally used in the field of polyurethane foams. Specific examples of MDI include 4,4-diphenylmethane diisocyanate (4,4-MDI) which is generally referred to as monomeric MDI, 2,4-diphenylmethane diisocyanate (2,4-MDI), 2,2-diphenylmethane diisocyanate (2,2-MDI), polymeric MDI, and crude MDI and the like.

One type of MDI may be contained alone or two or more types of MDI may be contained in the foaming stock solution.

The term "isocyanate equivalent" indicating the total amount of polyisocyanate contained in the foaming stock solution refers to a molar ratio of isocyanate groups when an active hydrogen amount (moles) in the foaming stock solution is set to 100.

The isocyanate equivalent derived from MDI contained in the foaming stock solution is at least 70 or more, preferably 70 to 120, and more preferably 80 to 100. When the isocyanate equivalent is 70 or more, it is possible to prevent the stirring failure of the foaming stock solution. When the isocyanate equivalent is 120 or less, it is possible to prevent the occurrence of foam disintegration.

In order for desired physical properties to be easily provided to the flexible polyurethane foam obtained by foam molding the foaming stock solution, as the total amount of the one, or two or more types of diphenylmethane diisocyanate of (C) with respect to a total mass of the polyisocyanate components contained in the foaming stock solution, 70 mass % or more is preferable, 80 to 100 mass % is more preferable, 90 to 100 mass % is still more preferable, and 95 to 100 mass % is most preferable.

In addition, as a content of pure MDI as the diphenylmethane diisocyanate of (C) with respect to a total mass of the polyisocyanate components contained in the foaming stock solution, 40 mass % or more is preferable, 50 to 90 mass % is more preferable, 55 to 85 mass % is still more preferable, and 60 to 80 mass % is most preferable.

<Cross-Linking Agent Component>

In order for the flexible polyurethane foam obtained by foam molding the foaming stock solution to have desired physical properties, as a cross-linking agent component of the foaming stock solution, a cross-linking agent having higher reactivity with respect to the polyisocyanate component than water is preferably contained as a main component. Generally, reactivity with respect to the polyisocyanate component decreases in an order of glycerin, a cross-linking agent (an EO-based cross-linking agent) including an ethylene oxide group, water, and a cross-linking agent (a PO-based cross-linking agent) including a propylene oxide group. Based on such a fact, as a molar ratio (the number of moles of EO groups/the number of moles of PO groups) between the EO groups and the PO groups contained in one, or two or more types of all compounds that are contained as a cross-linking agent in the foaming stock solution, 100 or more is preferable, 105 or more is more preferable, and 110 or more is most preferable. The higher molar ratios are more preferable. That is, it is preferable that a cross-linking agent including a PO group be not substantially contained in the foaming stock solution.

Here, the ethylene oxide group (EO group) refers to a group having a monovalent bond where one hydrogen atom constituting ethylene oxide has been removed. The propylene oxide group (PO group) refers to a group having a monovalent bond where one hydrogen atom constituting propylene oxide has been removed.

As a specific cross-linking agent component, a known cross-linking agent used in the field of polyurethane foams can be applied. Generally, the molecular weight of the cross-linking agent is preferably 1,000 or less. In consideration of an increase of the molar ratio of EO groups/PO groups, a commercially available cross-linking agent indicating "EO (groups)/PO (groups)=100/0" is preferable.

One type or two or more types of the cross-linking agent may be contained in the foaming stock solution. When a cross-linking agent whose molar ratio of EO groups/PO groups is 100 or more and glycerin are used in combination therewith, a mass ratio of the cross-linking agent/the glycerin is preferably 10:1 to 1:10, more preferably 5:1 to 1:5, and most preferably 2:1 to 1:2.

The total amount of the cross-linking agent component contained in the foaming stock solution with respect to 100 parts by mass of the polyol component is preferably 0.5 to 10 parts by mass and more preferably 1 to 5 parts by mass. Within an upper limit or less of this range, it is possible to prevent there being an excessive number independent pores, molding problems, and prevent foams from disintegrating. Within a lower limit or more of this range, an effect of the cross-linking agent is sufficiently obtained.

<Foaming Agent Component>

As a foaming agent component constituting the foaming stock solution, water is preferably used. Since water reacts with polyisocyanate and generates carbon dioxide gas, it serves as a foaming agent.

As a content of water in the foaming stock solution with respect to 100 parts by mass of the polyol component, 1 to 7 parts by mass is preferable, and 2 to 5 parts by mass is more preferable. Within this range, a flexible polyurethane foam having desired physical properties is easily obtained. In addition, it is possible to prevent a thermal compression residual strain characteristic of the obtained flexible polyurethane foam from deteriorating.

<Catalyst Component>

As a catalyst component constituting the foaming stock solution, a known catalyst used in the field of polyurethane foams is used. Examples of the known catalyst include an amine catalyst and a tin catalyst.

Generally, known catalysts are broadly classified into resin catalysts that promote resinification of a polyurethane and blowing catalysts that promote foaming of a polyisocyanate component.

An appropriate resin catalyst is a tertiary amine catalyst that specifically promotes a reaction between a polyisocyanate and a polyol, and is not particularly limited. For example, triethylenediamine, 1,8-diazabicyclo[5.4.0]undecene-7, imidazoles such as 1-methylimidazole, 1,2-dimethylimidazole, and 1-isobutyl-2-methylimidazole and the like, and 1,1'-(3-(dimethylamino)propyl)imino)bis(2-propanol) may be used. In addition, an appropriate blowing catalyst is a tertiary amine catalyst that specifically promotes a reaction between an isocyanate and water and effectively generates carbon dioxide gas, and is generally used to improve fluidity of a foam and dimensional stability. The blowing catalyst is not particularly limited, and bis(2-dimethylaminoethyl) ether, N,N,N',N'',N''-pentamethyldiethylenetriamine, and N,N,N',N'',N''',N'''-hexamethyltriethylentetramine and the like are exemplary examples.

In the foaming stock solution, at least a resin catalyst from a resin catalyst and a blowing catalyst is preferably contained as the catalyst component.

The mass ratio of the resin catalyst:the blowing catalyst contained in the foaming stock solution is preferably 100:0 to 100:100, more preferably 100:0 to 100:50 and further preferably 100:0 to 100:20.

The amount of 1,1'-(3-(dimethylamino)propyl)imino)bis (2-propanol) serving as the resin catalyst with respect to 100 parts by mass of the polyol component is preferably 0.1 to 2.0 parts by mass, more preferably 0.2 to 1.5 parts by mass, still more preferably 0.3 to 1.2 parts by mass, and most preferably 0.4 to 0.9 parts by mass. Within this range, a flexible polyurethane foam having desired physical properties is easily obtained.

When 1,1'-(3-(dimethylamino)propyl)imino)bis(2-propanol) serving as the resin catalyst and the blowing catalyst are used in combination therewith, a total content of both catalysts with respect to 100 parts by mass of the polyol component is preferably 0.1 to 1.5 parts by mass, more preferably 0.4 to 1.2 parts by mass and most preferably 0.7 to 1.0 parts by mass. Within this range, a flexible polyurethane foam having desired physical properties is easily obtained.

As the amine catalyst, in order to promote a resinification (gelation) reaction between polyols and polyisocyanates and promote urethane bond generation, a resin catalyst having a ratio of a blowing catalyst constant with respect to a gelation catalyst constant of $10 \times 10^{-1}$ or less is preferable.

Here, the gelation catalyst constant is a constant that determines a speed of a resinification reaction between polyols and polyisocyanates. As the value thereof increases, the crosslink density of a foam body increases, and the mechanical physical properties of the foam body improve. Specifically, the reaction constant of a gelation reaction between tolylene diisocyanate and diethylene glycol is used. On the other hand, the blowing catalyst constant is a constant that determines the speed of a blowing reaction between polyisocyanates and water. As a value thereof increases, communication between cells of the foam body increases. Specifically, the reaction constant of a blowing reaction between tolylene diisocyanate and water is used. The ratio between the two catalyst constants shows the balance between both catalysts.

Examples of appropriate amine catalysts and specific examples of the resin catalyst are exemplified below.

Specific examples of the resin catalyst including the above-described catalyst include tertiary amines such as triethylenediamine (TEDA), a mixture of triethylenediamine and polypropylene glycol, N,N,N',N'-tetramethylethylenediamine, N,N, N',N'-tetramethylpropylenediamine, N,N,N', N'',N''-pentamethyl-(3-aminopropyl)ethylenediamine, N,N, N',N'',N''-pentamethyldipropylenetriamine, N,N,N',N'-tetramethylguanidine, and 135-tris(N,N-dimethylaminopropyl)hexahydro-S-triazine and the like, imidazoles such as 1-methylimidazole, 1,2-dimethylimidazole, and 1-isobutyl-2-methylimidazole and the like, and additionally N,N,N',N'-tetramethylhexamethylenediamine, N-methyl-N'-(2-dimethylaminoethyl)piperazine, N,N'-dimethylpiperazine, N-methylpiperazine, N-methylmorpholine, and N-ethylmorpholine and the like.

The amount of the amine catalyst in the foaming stock solution with respect to 100 parts by mass of the polyol component is preferably 0.1 to 0.4 parts by mass, more preferably 0.2 to 0.4 parts by mass, and further preferably 0.3 to 0.4 parts by mass. Within the lower limit of 0.1 parts by mass of this range or more, it is possible to prevent foams from disintegrating. Within the upper limit of 0.4 parts by mass of this range or less, it is possible to prevent the occurrence of shrinkage due to independent pores.

Specific examples of the tin catalyst include known organic tin catalysts such as stannous octoate, stannous laurate, dibutyltin dilaurate, dibutyltin dimaleate, dibutyltin diacetate, dioctyltin diacetate, tin octylate, and the like.

The amount of the tin catalyst in the foaming stock solution with respect to 100 parts by mass of the polyol component is preferably 0.01 to 0.5 parts by mass, more preferably 0.01 to 0.4 parts by mass, and further preferably 0.01 to 0.2 parts by mass.

<Foam Stabilizer Component>

A foam stabilizer may be contained in the foaming stock solution. As the foam stabilizer, a known foam stabilizer used in the field of polyurethane foams can be applied. For example, a silicone-based foam stabilizer, an anionic foam stabilizer, and a cationic foam stabilizer may be used. A foam stabilizer having a hydroxyl group at a molecular chain terminal is included in such foam stabilizers.

The amount of the foam stabilizer in the foaming stock solution with respect to 100 parts by mass of the polyol component is preferably 0.1 to 5 parts by mass, more preferably 0.2 to 3 parts by mass, and further preferably 0.3 to 0.8 parts by mass. Generally, at a content of 5 parts by mass or less, an effect as the foam stabilizer is sufficiently obtained. In addition, at an amount of 0.1 parts by mass or more, the stirring properties of a polyol component and a polyisocyanate component increase, and a flexible polyurethane foam having desired physical properties is easily obtained.

<Other Optional Components>

Various additives can be blended into the foaming stock solution as necessary. For example, a coloring agent such as a pigment or the like, a chain extender, a filling material such as calcium carbonate or the like, a flame retardant, an antioxidant, an ultraviolet absorbing agent, a light stabilizer, a conductive substance such as carbon black or the like, and an antibacterial agent or the like can be blended in. The blending amount of various additives is appropriately regulated according to applications and purposes.

<Method of Preparing Foaming Stock Solution>

A method of preparing a foaming stock solution is not particularly limited. For example, a method of preparing a foaming stock solution in which a mixture of the remaining components other than a polyisocyanate component (hereinafter abbreviated as a "polyol mixture") is prepared and then mixed with the polyisocyanate component may be provided.

When the polyol mixture is prepared, in order to reduce the contact of water serving as a foaming agent with a catalyst component, preferably, the catalyst component is first mixed with the polyol component, and a foam stabilizer component, a cross-linking agent component, and an optional component are then mixed in as necessary, and water serving as a foaming agent is finally mixed in.

Then, in a process in which foam molding of a flexible polyurethane foam is performed, it is preferable to prepare a foaming stock solution by mixing the polyol mixture with the polyisocyanate component.

A viscosity, at a liquid temperature of 25° C., of the prepared polyol mixture is preferably 2,400 mPa·s or less, and more preferably 1,800 mPa·s or less. Within such an appropriate viscosity range, stirring efficiency of the foaming stock solution is favorable, a sufficient amount of foam is uniformly obtained in all the foaming stock solution and a flexible polyurethane foam having desired physical properties (a foam molded article) is easily obtained.

A method of foam molding the flexible polyurethane foam by using the foaming stock solution is not particularly limited. For example, a known method of foam molding in which a foaming stock solution is injected into a cavity that is formed in a mold can be applied.

In the above known method, in order to prevent components constituting the foaming stock solution from being separated, the above-described components are preferably mixed to prepare the foaming stock solution immediately before the foaming stock solution is injected into the cavity. The liquid temperature of the foaming stock solution to be injected is preferably 10 to 50° C., more preferably 20 to 40° C. and further preferably 25 to 35° C. The temperature of the mold is preferably 40 to 80° C., more preferably 50 to 70° C., and further preferably 60 to 65° C. When the liquid temperature of the foaming stock solution and the temperature of the mold are within the above appropriate ranges, appropriate foaming is obtained. Subsequent to the foaming, after curing is performed in the mold, a target flexible polyurethane foam is obtained by demolding. A known film removal treatment may be further performed on the flexible polyurethane foam obtained here.

Here, the "flexibility" of the flexible polyurethane foam according to the present invention refers to a hardness (stiffness) to such an extent that the flexible polyurethane foam is deformed and recessed when the flexible polyurethane foam is pressed by hand or a user sits thereon.

As described above, according to the seat pad 1 (flexible polyurethane foam molded article) of the present embodiment, when the entire seat pad 1 is compressed by 15% in the vertical direction Y, the front surface layer L1 among the plurality of layer parts L1 to L10 has the lowest residual thickness ratio in the vertical direction Y among the plurality of layer parts L1 to L10. Therefore, for example, when an occupant initially sits on the seating surface 1A or a mounting object is initially mounted, the front surface layer L1 can be easily and actively deflected. Therefore, for example, it is possible to accurately deform the front surface layer L along an occupant so that it is unlikely to cause a feeling of hardness or the like for the occupant when seated and it is possible to maintain a favorable feeling of seating.

On the other hand, when the entire seat pad 1 is compressed by 50% in the vertical direction Y, the back surface layer L10 among the plurality of layer parts L1 to L10 has the highest residual thickness ratio in the vertical direction Y among the plurality of layer parts L1 to L10. Therefore, for example, while the occupant sits on the seating surface 1A and a sufficient time has elapsed or a mounting object is mounted and a sufficient time has elapsed, according to the back surface layer L10, the occupant can be stably and easily held through the front surface layer L1, and it is possible to reduce the feeling of shakiness.

In addition, when the entire seat pad 1 is largely compressed in the vertical direction Y, the residual thickness ratio of the front surface layer L1 decreases while a rate of change decreases. Therefore, for example, when an occupant initially sits on the seating surface 1A or a mounting object is initially mounted, the front surface layer L1 can be easily and largely bent in the vertical direction Y, and it is possible to reliably impart a favorable feeling of seating to the seat pad 1.

In addition, when the entire seat pad 1 is largely compressed in the vertical direction Y, the residual thickness ratio in the back surface adjacent layer L9 decreases while a rate of change increases. Therefore, for example, when an occupant initially sits on the seating surface 1A or a mounting object is initially mounted, it is possible to easily prevent the entire seat pad 1 from being excessively bent in the vertical direction Y, and it is possible to reliably reduce a feeling of shakiness.

EXAMPLES

Figure 3:
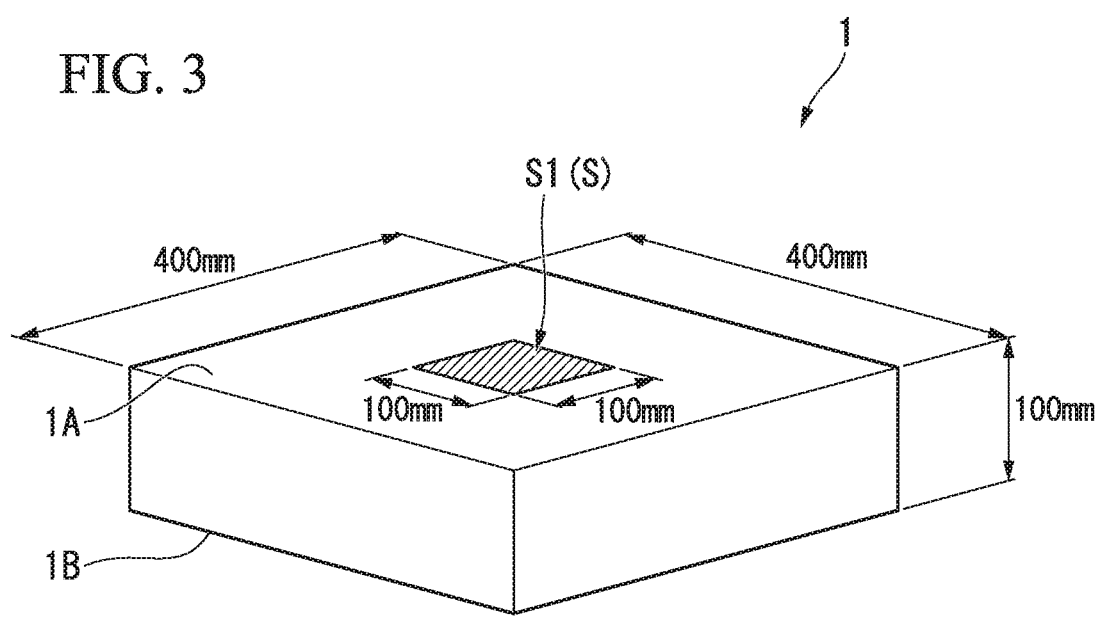
FIG. 3 is a perspective view showing a method of collecting an evaluation sample from a seat pad according to an example of the present invention.
Figure 4:
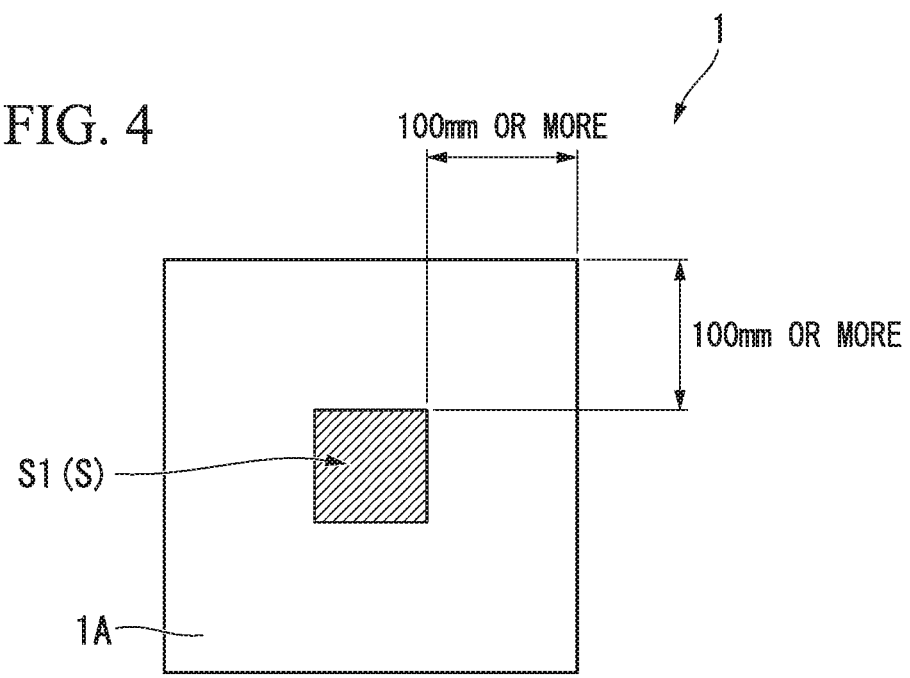
FIG. 4 is a plan view showing a method of collecting an evaluation sample from a seat pad according to an example of the present invention.

A urethane blended stock solution prepared by mixing a solution including a polyol component blend having the proportion shown in Table 1 and an isocyanate component was injected into the cavity C of the mold 3 and subjected to foam molding to produce a test piece of the seat pad 1 having a flat rectangular parallelepiped shape shown in FIG. 3 and FIG. 4 (hereinafter simply referred to as a "seat pad 1"), and the residual thickness ratio described above was measured. The seating surface 1A of the seat pad 1 had a square shape whose length on one side was 400 mm and the thickness of the entire seat pad 1 was 100 mm.

TABLE 1

| | Content | Example | Comparative example |
|---|---|---|---|
| Polyol | Polyether polyol (A1-1) | 100 | — |
| | Polyether polyol (A1-2) | — | 45 |
| | Polymer polyol (A2-1) | — | 45 |
| | Cross-linking agent (C-1) | — | 6.5 |
| | Cross-linking agent (C-2) | 1 | 3.5 |
| | Cross-linking agent (C-3) | 1 | — |
| | Catalyst (D-1) | 0.9 | — |
| | Catalyst (D-2) | — | 0.4 |
| | Catalyst (D-3) | — | 0.2 |
| | Catalyst (D-4) | — | 0.3 |
| | Foam stabilizer (E-1) | 0.4 | — |
| | Foam stabilizer (E-2) | — | 1 |
| | Foaming agent (F-1) | 3.3 | 2.4 |
| | Sum (unit: parts by weight) | 106.6 | 104.3 |
| Isocyanate | Polyisocyanate (B-1) | 84 | — |
| (unit: equivalents) | Polyisocyanate (B-2) | — | 86 |

Proportions in Table 1 are proportions of an example and a comparative example. In Table 1, details of materials indicated by model numbers or names are as follows.

The "polyether polyol A1-1" had an EO/PO molar ratio of 16/84, a weight-average molecular weight of 7000, and four functional groups.

The "polyether polyol A1-2" had an EO/PO molar ratio of 13/87, a weight-average molecular weight of 7000, and three functional groups.

The "polymer polyol A2-1" was a 3.2 functional polymer polyol (product name: KC855 commercially available from Sanyo Chemical Industries, Ltd.) having a solid content of 33%, a hydroxyl value of 23 mgKOH/g, and a weight-average molecular weight of 5400.

The "cross-linking agent C-1" had an EO/PO molar ratio of 0/100, a weight-average molecular weight of 700, and three functional groups.

The "cross-linking agent C-2" had an EO/PO molar ratio of 100/0, a weight-average molecular weight of 400, and four functional groups.

The "cross-linking agent C-3" was glycerin.

The "Catalyst D-1" was 1,1'-(3-(dimethylamino)propyl) imino)bis(2-propanol) which is a commercially available resin catalyst.

The "Catalyst D-2" was triethylenediamine which is a commercially available resin catalyst.

The "Catalyst D-3" was (2-dimethylaminoethyl)ether which is a commercially available blowing catalyst.

The "Catalyst D-4" was a commercially available diethanolamine that catalyzed both resinification and foaming.

The "Foam stabilizer E-1" was a low active type silicone foam stabilizer (product name: B8734 commercially available from Evonik Industries).

The "Foam stabilizer E-2" was a high active type silicone foam stabilizer (product name: B8742 commercially available from Evonik Industries).

The "Foaming agent F-1" was water.

The "polyisocyanate (B-1)" was an MDI-based isocyanate. A TDI-based isocyanate was substantially not contained.

The "Polyisocyanate (B-2)" was a TDI-based isocyanate which was a commercially available polyisocyanate and mixed at a mass ratio of TDI/MDI=80/20.

An evaluation sample S was collected from the seat pad 1 before measurement.

Specifically, the evaluation sample S was collected by extracting a sample part SI which is part of the seat pad 1 in the vertical direction Y. The shape of the evaluation sample S was a cube whose length on one side was 100 mm. As shown in FIG. 4, sides constituting the outer circumferential edge of the sample part S1 were parallel to sides constituting the outer circumferential edge of the seat pad 1, and these sides were separated 100 mm or more from each other.

Next, a method of measuring a residual thickness ratio will be described.

Figure 5:
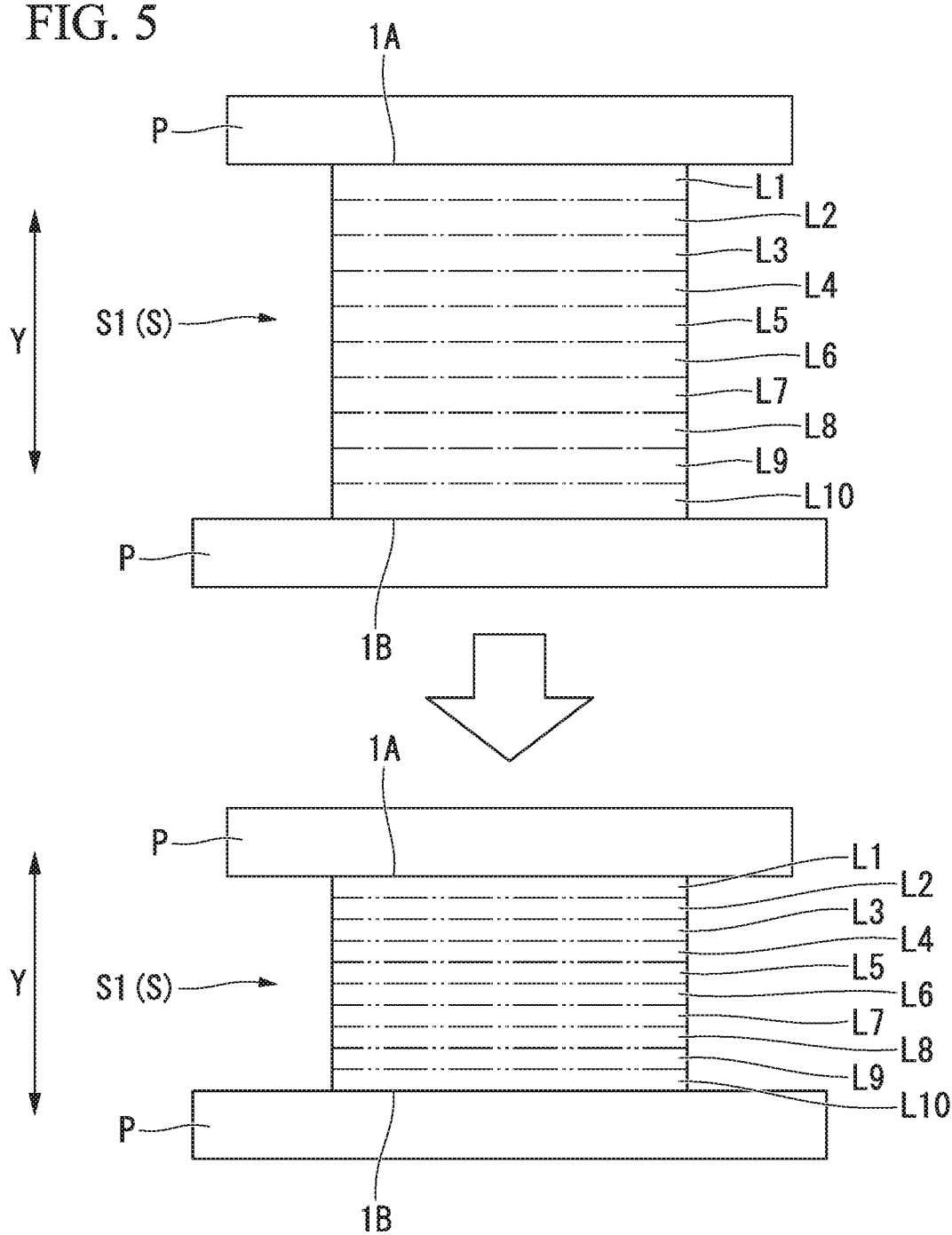
FIG. 5 is a front view showing states before and after an evaluation sample is compressed.

First, as shown in FIG. 5, partitioning lines for partitioning the layer parts L1 to L10 were drawn on the evaluation sample S in a no-load state, and the evaluation sample S was interposed between a pair of upper and lower pressing plates P. The pressing plate P was formed to cover the entire evaluation sample S in a plan view, and compressed the entire surface of the evaluation sample S. Then, an interval between the pair of pressing plates P was narrowed by using, for example, a testing machine that can pressurize the pressing plate P at a desired pressure, a compression ratio ((thickness reduced by compression)/(thickness in a no-load state)) of the evaluation sample S in the vertical direction Y gradually increased, the thicknesses (interval between adjacent partitioning lines in the vertical direction Y) of the layer parts L1 to L10 were measured in 5% increments until the compression ratio reached 0% to 50%, and the residual thickness ratio of the layer parts L1 to L10 was calculated. Here, in FIG. 5, the thicknesses of the layer parts L1 to L10 after the entire surface of the evaluation sample S was compressed were schematically shown to be equal to each other.

Figure 6:
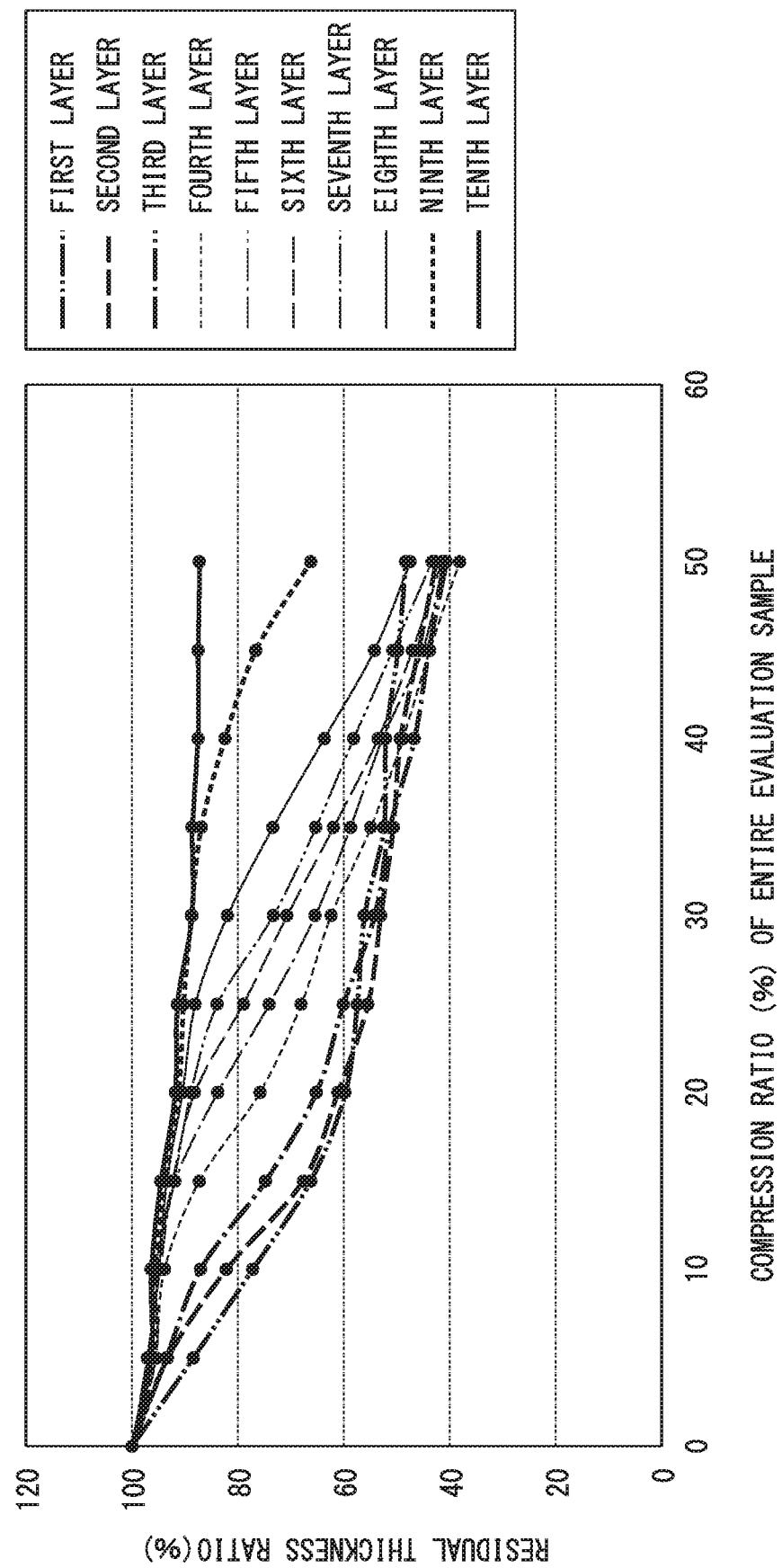
FIG. 6 is a graph showing evaluation results of the example of the present invention.
Figure 7:
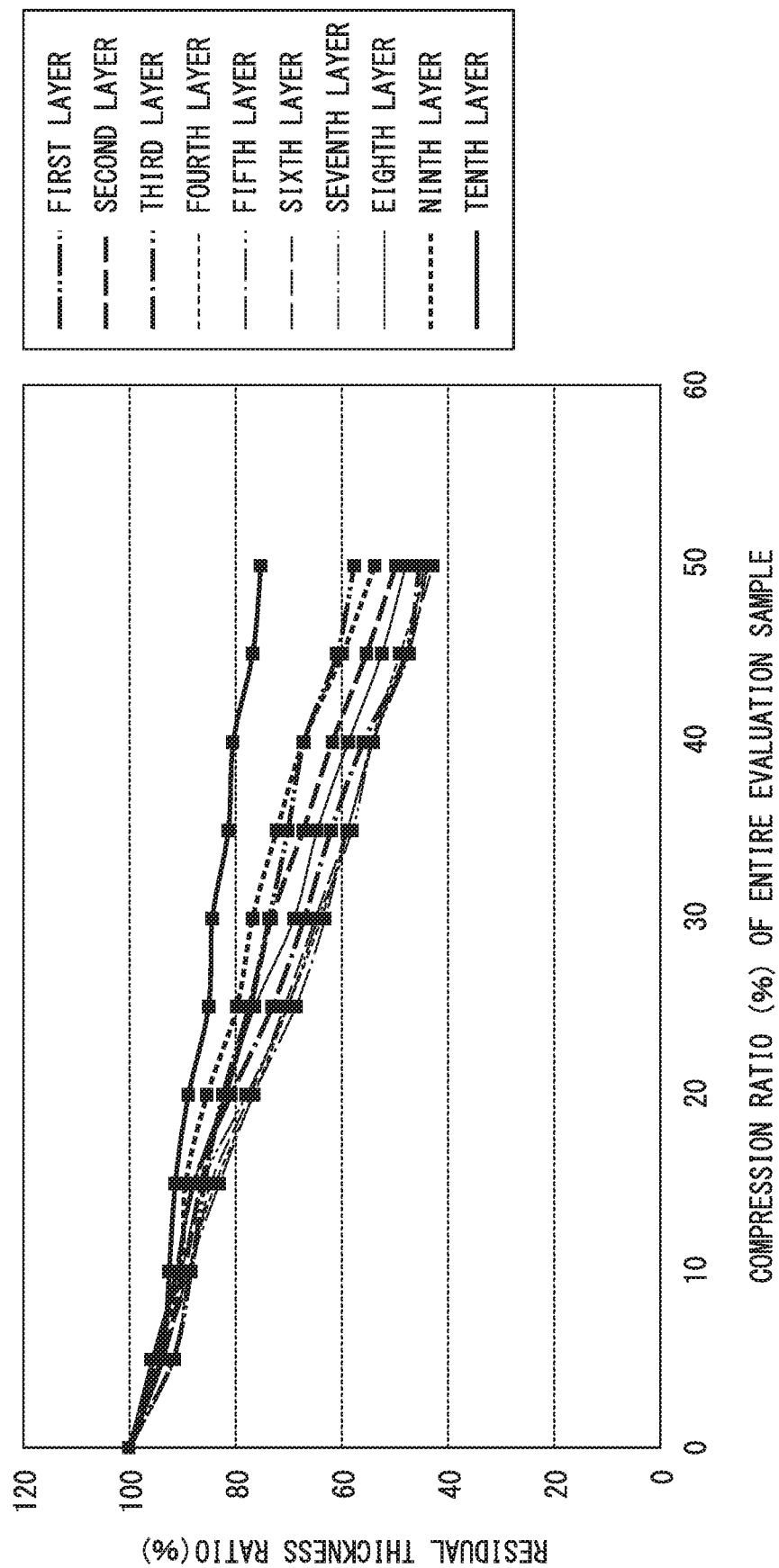
FIG. 7 is a graph showing evaluation results of a comparative example of the present invention.

Based on such a measurement method, results of the residual thickness ratios of the layer parts L1 to L10 obtained in the example and the comparative example are shown in the graphs in FIG. 6 and FIG. 7 and Table 2 and Table 3. The residual thickness ratios of the layer parts L1 to L10 in the example are shown in FIG. 6 and Table 2. The residual thickness ratios of the layer parts L1 to L10 in the comparative example are shown in FIG. 7 and Table 3. In these drawings and tables, the layer parts L1 to L10 were numbered as the first layer, the second layer, . . . , and the tenth layer from the seating surface 1A to the back surface 1B in the vertical direction Y. That is, the first layer was the front surface layer L1, the tenth layer was the back surface layer L10, and the ninth layer was the back surface adjacent layer L9.

Here, in the graphs shown in FIG. 6 and FIG. 7, the horizontal axis represents the compression ratio (%) of the entire evaluation sample S (the seat pad 1) and the vertical axis represents the residual thickness ratio (%) of the layer parts L1 to L10. In addition, Table 2 and Table 3 show the same content shown in FIG. 6 and FIG. 7, that is, show the residual thickness ratio (%) of the layer parts L1 to L10 with respect to the compression ratio (%) of the entire evaluation sample S (the seat pad 1).

TABLE 2

| | Compression ratio of entire evaluation sample | | | | | | | | | | |
|---|---|---|---|---|---|---|---|---|---|---|---|
| | 0% | 5% | 10% | 15% | 20% | 25% | 30% | 35% | 40% | 45% | 50% |
| First layer | 100 | 88.4 | 77.2 | 66.2 | 59.7 | 57.5 | 56.1 | 52.4 | 52.1 | 49.8 | 48.3 |
| Second layer | 100 | 93.3 | 82.2 | 67.7 | 61.1 | 55.4 | 53.1 | 50.7 | 49.3 | 45.9 | 42.6 |
| Third layer | 100 | 93.5 | 87.1 | 74.7 | 65.2 | 60.1 | 54.2 | 51.3 | 46.6 | 44.0 | 40.6 |
| Fourth layer | 100 | 95.7 | 93.9 | 87.3 | 75.9 | 68.0 | 62.4 | 54.9 | 48.9 | 43.8 | 38.2 |
| Fifth layer | 100 | 97.1 | 94.7 | 91.9 | 83.8 | 74.0 | 65.4 | 58.8 | 52.7 | 45.1 | 41.2 |
| Sixth layer | 100 | 95.5 | 95.4 | 92.3 | 88.2 | 79.0 | 70.7 | 61.9 | 53.5 | 47.1 | 41.5 |
| Seventh layer | 100 | 96.8 | 95.6 | 92.1 | 88.9 | 83.9 | 73.3 | 65.3 | 58.2 | 50.8 | 43.4 |
| Eighth layer | 100 | 97.0 | 94.9 | 93.5 | 90.5 | 88.1 | 82.0 | 73.4 | 63.7 | 54.2 | 47.5 |
| Ninth layer | 100 | 95.9 | 95.7 | 93.6 | 91.2 | 90.3 | 88.8 | 86.9 | 82.4 | 76.6 | 66.2 |
| Tenth layer | 100 | 96.4 | 96.4 | 94.5 | 91.8 | 91.5 | 88.6 | 88.6 | 87.5 | 87.5 | 87.2 |

TABLE 3

| | Compression ratio of entire evaluation sample | | | | | | | | | | |
|---|---|---|---|---|---|---|---|---|---|---|---|
| | 0% | 5% | 10% | 15% | 20% | 25% | 30% | 35% | 40% | 45% | 50% |
| First layer | 100 | 91.7 | 88.3 | 85.7 | 82.3 | 77.3 | 73.5 | 69.9 | 66.9 | 60.6 | 57.4 |
| Second layer | 100 | 93.7 | 89.6 | 86.4 | 81.7 | 77.0 | 73.0 | 67.0 | 61.5 | 55.0 | 49.4 |
| Third layer | 100 | 95.1 | 91.0 | 87.7 | 80.7 | 72.8 | 66.8 | 61.7 | 55.6 | 47.5 | 45.0 |
| Fourth layer | 100 | 91.4 | 88.7 | 83.6 | 76.4 | 69.9 | 63.6 | 58.6 | 54.1 | 48.7 | 43.2 |
| Fifth layer | 100 | 93.5 | 88.9 | 82.9 | 76.5 | 68.4 | 62.8 | 58.6 | 53.8 | 47.9 | 44.0 |
| Sixth layer | 100 | 94.2 | 88.2 | 84.5 | 77.0 | 70.6 | 64.8 | 58.7 | 53.9 | 47.5 | 42.4 |
| Seventh layer | 100 | 95.1 | 90.1 | 86.2 | 77.7 | 70.0 | 64.2 | 57.7 | 53.8 | 47.0 | 43.5 |
| Eighth layer | 100 | 95.8 | 91.0 | 87.7 | 81.8 | 76.2 | 68.7 | 64.4 | 58.5 | 52.1 | 47.6 |
| Ninth layer | 100 | 95.0 | 90.3 | 89.3 | 85.2 | 79.6 | 76.6 | 72.0 | 67.0 | 59.5 | 53.5 |
| Tenth layer | 100 | 93.9 | 92.4 | 91.3 | 88.8 | 84.9 | 84.3 | 81.2 | 80.3 | 76.6 | 75.0 |

As shown in FIG. 6 and Table 2, in the example, when the entire seat pad 1 was compressed by 15% in the vertical direction Y, the front surface layer L had the lowest residual thickness ratio, 66.2%, among the plurality of layer parts L1 to L10. In addition, when the entire seat pad 1 was compressed by 50% in the vertical direction Y, the back surface layer L10 had the highest residual thickness ratio, 87.2%, among the plurality of layer parts L1 to L10.

In addition, in the example, when the entire seat pad 1 was largely compressed in the vertical direction Y, the residual thickness ratio of the front surface layer L1 decreased while a rate of change decreased. In the graph shown in FIG. 6, a graph line of the front surface layer L1 was formed in a curved shape that is convex downward. Here, in the graph shown in FIG. 6, in addition to the graph line of the front surface layer L1, a graph line of at least the second layer was formed in a curved shape that is convex downward.

In addition, in the example, when the entire seat pad 1 was largely compressed in the vertical direction Y, the residual thickness ratio of the back surface adjacent layer L9 decreased while a rate of change increased. In the graph shown in FIG. 6, a graph line of the back surface adjacent layer L9 was formed in a curved shape that is convex upward. Here, in the graph shown in FIG. 6, in addition to the graph line of the back surface adjacent layer L9, a graph line of at least the eighth layer was formed in a curved shape that is convex upward.

On the other hand, as shown in FIG. 7 and Table 3, in the comparative example, when the entire seat pad 1 was compressed by 15% in the vertical direction Y, the residual thickness ratio of the front surface layer L1 was 85.7%, which was higher than the residual thickness ratios of the fourth layer to the sixth layer.

In addition, in the comparative example, when the entire seat pad 1 was largely compressed in the vertical direction Y, the residual thickness ratios of the layer parts L1 to L10 decreased while a rate of change was equally maintained. In the graph shown in FIG. 7, graph lines of the layer parts L1 to L10 were formed linearly (in a straight line).

Figure 9:
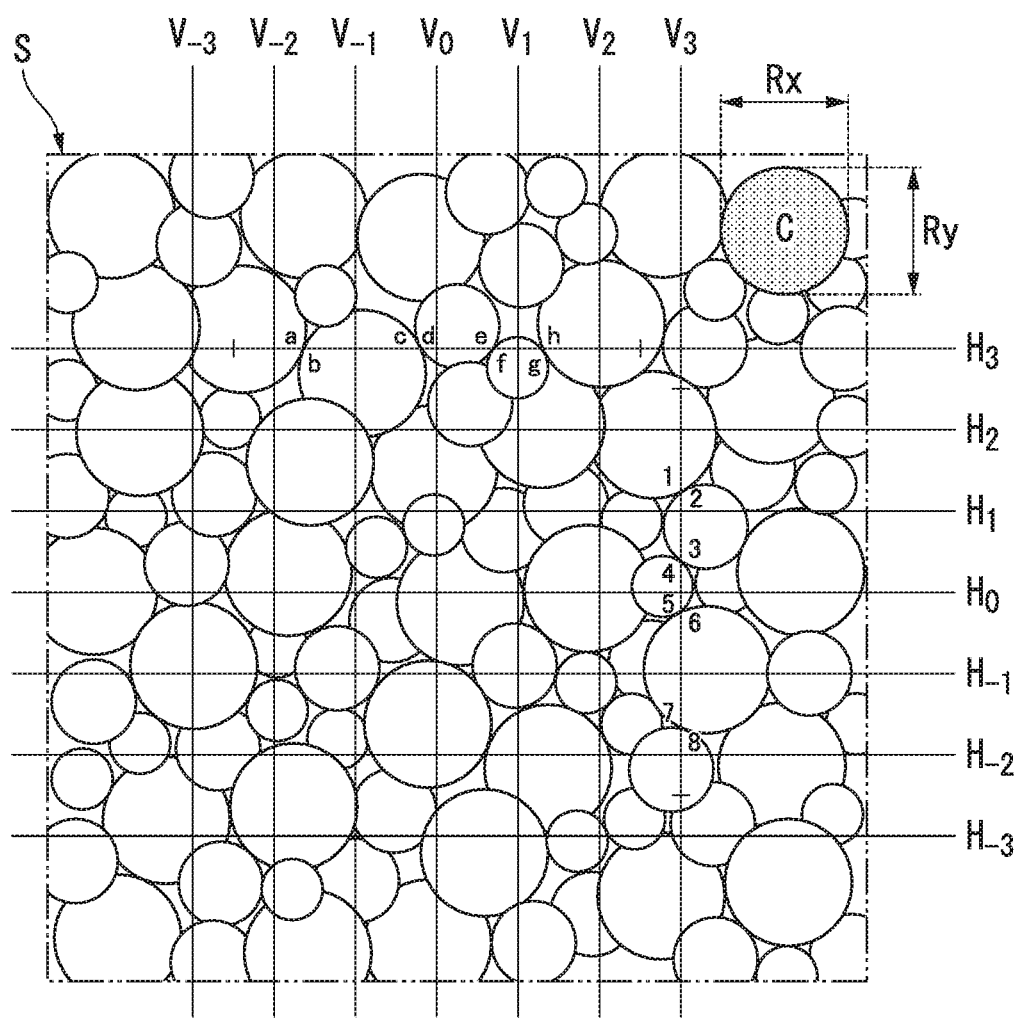
FIG. 9 is a conceptual diagram showing a method of measuring an evaluation sample using a microscope.

Next, results obtained by observing the evaluation samples S in the above example and comparative example using a microscope will be described with reference to FIG. 9. FIG. 9 is a conceptual diagram explaining a method of measuring the evaluation samples S in the example and the comparative example using a microscope.

Pictures in which central parts of the layer parts L1 to L10 of the evaluation sample S were enlarged using an optical microscope were acquired, and lines that pass through the center of the picture and extend in vertical and horizontal directions were set as a vertical reference line $V_0$ and a the horizontal reference line $H_0$. In addition, vertical and horizontal lines were equally divided at intervals of 2 mm from the vertical reference line $V_0$ and the horizontal reference line $H_0$. Here, the vertical and horizontal lines also include the above vertical reference line $V_0$ and horizontal reference line $H_0$. Regarding the vertical line, the vertical reference line $V_0$ and three each of the vertical lines on both sides thereof among the vertical lines were measurement targets. That is, in the example in FIG. 9, measurement targets were $V_{-3}$, $V_{-2}$, $V_{-1}$, $V_0$, $V_1$, $V_2$, and $V_3$. Thus, in a range of 6 mm centered on the horizontal reference line $H_0$ for each of the vertical lines, the number of intersections between frameworks of foam cells and the vertical line was counted visually, an average of count values for each of the seven vertical lines was obtained, and the average value was assumed to be a diameter Ry of the foam cell in the vertical direction. For example, in the example in FIG. 9, at $V_3$, in a range of 6 mm centered on the horizontal reference line $H_0$, eight intersections between frameworks of foam cells indicated by 1, 2, 3, 4, 5, 6, 7, and 8 and the vertical line were counted. These were counted for all of $V_{-3}$, $V_{-2}$, $V_{-1}$, $V_0$, $V_1$, $V_2$, and $V_3$, the average thereof was calculated, and this average was assumed to be the diameter Ry of the foam cell in the vertical direction.

In addition, similarly in the lateral direction, among the horizontal lines, the horizontal reference line $H_0$ and three each of the horizontal lines on both sides thereof were measurement targets. That is, in the example in FIG. 9, measurement targets were $H_{-3}$, $H_{-2}$, $H_{-1}$, $H_0$, $H_1$, $H_2$, and $H_3$. In a range of 10 mm centered on the vertical reference line $V_0$ for each of the horizontal lines, the number of intersections between frameworks of foam cells and the horizontal line was counted visually, an average of count values for each of the seven horizontal lines was obtained, and the average value was assumed to be a diameter Rx of the foam cell in the lateral direction. For example, in the example in FIG. 9, at $H_3$, in a range of 10 mm centered on the vertical reference line $V_0$, eight intersections between frameworks of foam cells indicated by a, b, c, d, e, f, g, and h and the vertical line were counted. These were counted for all of $H_{-3}$, $H_{-2}$, $H_{-1}$, $H_0$, $H_1$, $H_2$, and $H_3$, an average thereof was calculated, and this average was assumed to be the diameter Rx of the foam cell in the lateral direction.

Then, vertical and horizontal sizes of the foam cell was calculated by Rx/Ry (a reciprocal of the average value), and the aspect ratio can be measured.

Here, the size of the above-described evaluation sample S (cube), intervals between vertical and horizontal lines, the number of divisions, the count range (length), and the like can be appropriately changed.

As described above, the aspect ratios of the layer parts L to L10 of the evaluation samples S in the example and the comparative example were measured, and results shown in Table 4 were obtained. In addition, when the results were represented by a graph in which the horizontal axis represents the front surface layer L1 to the back surface layer L10 and the vertical axis represents the aspect ratio, the graph shown in FIG. 10 was obtained.

TABLE 4

| Layer | Example | Comparative example |
| --- | --- | --- |
| 1 | 1.44 | 1.46 |
| 2 | 1.42 | 1.55 |
| 3 | 1.41 | 1.44 |
| 4 | 1.39 | 1.46 |
| 5 | 1.38 | 1.48 |
| 6 | 1.38 | 1.44 |
| 7 | 1.37 | 1.45 |
| 8 | 1.36 | 1.50 |
| 9 | 1.36 | 1.42 |
| 10 | 1.34 | 1.45 |

FIG. 10 is a graph in which the aspect ratios of the layer parts in the example and the comparative example are compared. In FIG. 10, it can be understood that, in the example, the aspect ratio decreased uniformly from the front surface layer L1 to the back surface layer L10. On the other hand, it can be understood that, in the comparative example, the aspect ratio was in a certain range from the front surface layer L to the back surface layer L10 and did not significantly change. Here, it can be understood that, in consideration of the aspect ratio that is defined as Rx/Ry, in the example, since the aspect ratio uniformly decreased from the front surface layer L1 to the back surface layer L10, the ratio of the diameter of the foam cell in the lateral direction with respect to the diameter of the foam cell in the vertical direction increased toward the stage surface in the vertical direction. Similarly, it can be understood that, in the comparative example, the ratio of the diameter of the foam cell in the lateral direction with respect to the diameter of the foam cell in the vertical direction did not uniformly change toward the stage surface in the vertical direction.

When the aspect ratio in the example was analyzed in further detail, the aspect ratio of the front surface layer L1 was 1.44, and the aspect ratio of the back surface layer L10 was 1.34. In addition, the aspect ratios of the layer parts L5 and L6 positioned at the center in the vertical direction were both 1.38.

In the seat pad 1 of the example described above, it is possible to reduce a feeling of shakiness while preventing a feeling of seating from being impaired compared to the seat pad 1 of the comparative example.

Figure 8:
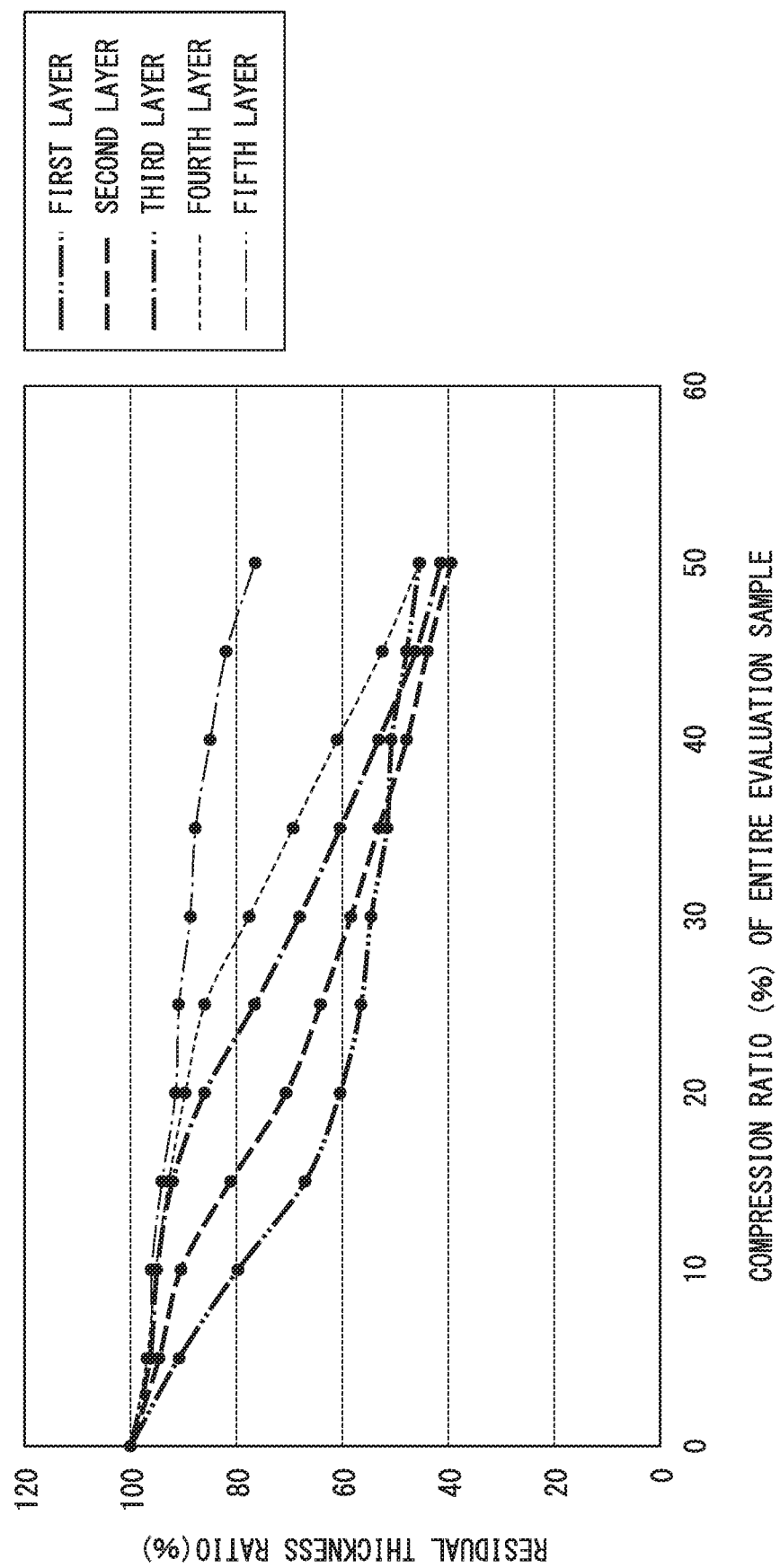
FIG. 8 is a graph showing evaluation results obtained when the number of layer parts is different in the example of the present invention.

Here, in the example, the seat pad 1 in a no-load state was equally divided into five layers in the vertical direction Y instead often layers, the residual thickness ratios of the layer parts were obtained, and the results shown in FIG. 8 were obtained.

Even in such a case, when the entire seat pad was compressed by 15% in the vertical direction, the front surface layer (the first layer in the graph in FIG. 8) had the lowest residual thickness ratio among the plurality of layer parts. In addition, when the entire seat pad was compressed by 50% in the vertical direction, the back surface layer (the fifth layer in the graph in FIG. 8) had the highest residual thickness ratio among the plurality of layer parts. In addition, when the entire seat pad was largely compressed in the vertical direction, the residual thickness ratio of the front surface layer decreased while a rate of change decreased. In the graph shown in FIG. 8, a graph line of the front surface layer (the first layer) was formed in a curved shape that is convex downward. In addition, in the example, when the entire seat pad was largely compressed in the vertical direction, the residual thickness ratio of the back surface adjacent layer (the fourth layer in the graph in FIG. 8) decreased while a rate of change increased. In the graph shown in FIG. 8, a graph line of the back surface adjacent layer is formed in a curved shape that is convex upward.

Here, the technical scope of the present invention is not limited to the embodiment, and various modifications can be added without departing from the scope of the present invention.

For example, in the present embodiment, the seat pad 1 is applied as the flexible polyurethane foam molded article, but the present invention is not limited thereto, and can be applied for various application products such as a chair inside a room, a cushion material for bedding, and a cushioning material for house flooring in addition to the seat pad of a vehicle such as an automobile.

In addition, the flexible polyurethane foam molded article is not limited to a product on which a person sits but may be a product on which an object and the like are mounted.

In addition, the flexible polyurethane foam molded article is not limited to a configuration in which the stage surface extends in the horizontal direction perpendicular to the vertical direction like the seating surface 1A of the present embodiment, and can be used for various application products, for example, a configuration or the like in which the stage surface extends in the vertical direction.

In the embodiment, when the entire seat pad 1 is largely compressed in the vertical direction Y, the residual thickness ratio of the back surface adjacent layer L9 decreases while a rate of change increases. However, the present invention is not limited thereto. For example, another configuration in which, among the plurality of layer parts L1 to L10, the residual thickness ratio in at least one layer positioned on the side of the back surface 1B relative to the center of the seat pad 1 in the vertical direction Y decreases while a rate of change increases as described above can be appropriately applied. For example, among the layer parts L6 to L10 (the sixth layer to the tenth layer), the residual thickness ratio in a layer different from the back surface adjacent layer L9 may decrease while a rate of change increases as described above. In addition, the residual thickness ratios in the plurality of layers among the layer parts L6 to L10 (the sixth layer to the tenth layer) may decrease while a rate of change increases as described above.

Here, when a configuration in which, when the center of the seat pad 1 in the vertical direction Y is included in one layer (hereinafter referred to as an "intermediate layer") among the plurality of layer parts, the residual thickness ratio in at least one layer positioned on the side of the back surface 1B relative to the intermediate layer decreases while a rate of change increases as described above is used, the same operations and effects can be obtained.

In addition, without departing from the scope of the present invention, components in the above embodiment can be appropriately replaced with well-known components, and the above modified examples may be appropriately combined.

INDUSTRIAL APPLICABILITY

According to the present invention, it is possible to provide a flexible polyurethane foam molded article and a seat pad through which it is possible to reduce the feeling of shakiness while preventing the feeling of seating from being impaired.

REFERENCE SIGNS LIST

1 Seat pad
1A Seating surface (stage surface)
1B Back surface (non-stage surface)
L1 to L10 Layer part
Y Vertical direction

The invention claimed is:
1. A flexible polyurethane foam molded article that has a stage surface, and an opposed non-stage surface,
   the flexible polyurethane foam molded article obtained by foam molding a foaming stock solution comprised of a polyol, a polvisocyanate, a crosslinking agent, a foaming agent and a catalyst,
   the flexible polyurethane foam molded article having a thickness of from 30 to 150 mm and comprising:
   a plurality of foamed layers that are layered in a vertical direction perpendicular to the stage surface, the plurality of foamed layers being substantially equally divided in a horizontal direction parallel to the stage surface in a no-load state,
   wherein, when the entire flexible polyurethane foam molded article is compressed by 15% in the vertical direction, a front surface layer positioned closest to the stage surface in the vertical direction among the plurality of foamed layers has the lowest residual thickness ratio in the vertical direction among the plurality of foamed layers,
   wherein, when the entire flexible polyurethane foam molded article is compressed by 50% in the vertical direction, a back surface layer positioned closest to the non-stage surface in the vertical direction among the plurality of foamed layers has the highest residual thickness ratio in the vertical direction among the plurality of foamed layers, and wherein the residual thickness ratio of the foamed layer refers to a ratio of a thickness of the foamed layer in a load-applied state with respect to a thickness of the foamed layer in the no-load state.

2. The flexible polyurethane foam molded article according to claim 1, wherein, when the entire flexible polyurethane foam molded article is compressed by 40-50% in the vertical direction, the residual thickness ratio of the front surface layer decreases while a rate of change decreases.

3. The flexible polyurethane foam molded article according to claim 2, wherein, when the entire flexible polyurethane foam molded article is compressed by 40-50% in the vertical direction, a residual thickness ratio in at least one layer positioned on the side of the non-stage surface relative to the center of the flexible polyurethane foam molded article in the vertical direction among the plurality of foamed layers decreases while a rate of change increases.

4. A seat pad which is used as a seating part attached to a vehicle, wherein the seat pad is the flexible polyurethane foam molded article according to claim 3.

5. A seat pad which is used as a seating part attached to a vehicle, wherein the seat pad is the flexible polyurethane foam molded article according to claim 2.

6. The flexible polyurethane foam molded article according to claim 1, wherein, when the entire flexible polyurethane foam molded article is compressed by 40-50% in the vertical direction, a residual thickness ratio in at least one layer positioned on a side of the non-stage surface relative to the center of the flexible polyurethane foam molded article in the vertical direction among the plurality of foamed layers decreases while a rate of change increases.

7. A seat pad which is used as a seating part attached to a vehicle, wherein the seat pad is the flexible polyurethane foam molded article according to claim 6.

8. A seat pad which is used as a seating part attached to a vehicle, wherein the seat pad is the flexible polyurethane foam molded article according to claim 1.

* * * * *